Figure 1:
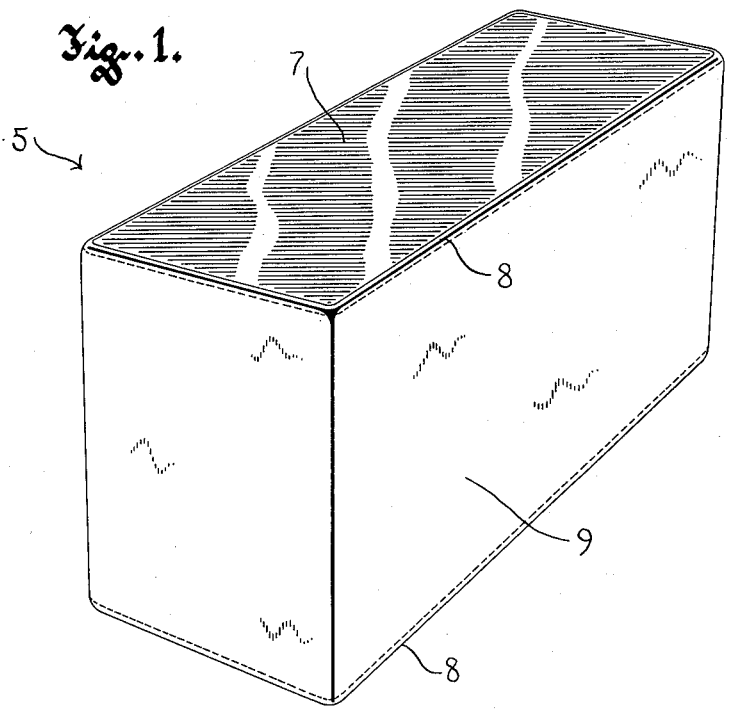

Dec. 4, 1956  R. A. GIERLICH  2,772,483
COMPOSITE GAGE BLOCK
Filed May 12, 1955

Inventor
Raymond A. Gierlich
By
Attorney

United States Patent Office 2,772,483
Patented Dec. 4, 1956

2,772,483

COMPOSITE GAGE BLOCK

Raymond A. Gierlich, Shakopee, Minn., assignor to Continental Machines, Inc., Savage, Minn., a corporation of Minnesota Application May 12, 1955, Serial No. 507,935

3 Claims. (Cl. 33—168)

This invention relates to gage blocks and refers more particularly to a composite gage block having extremely hard and durable gaging surfaces.

It is not only necessary that a precision gage block be very accurately finished to provide the required precise gaging dimension and true flatness and parallelism of the gaging surfaces, but it is also necessary that such a block be dimensionally stable and have a coefficient of thermal expansion on the order of that of the material with which it is most frequently used. It is also extremely desirable that a precision gage block have very hard and durable gaging surfaces which are resistant to corrosion as well as abrasion.

To some extent these requirements are incompatible with one another since materials suitable for the production of gaging surfaces of the required hardness and durability possess other characteristics which make them undesirable for the body of a gage block. Heretofore this difficulty has been substantially overcome by forming a gage block body of steel and then bonding to each gaging face of this body block a layer of extremely hard and durable material which can be finished to the required gaging accuracy.

One manner in which such plating of the gaging faces of a steel block may be accomplished is by the application of tungsten carbide thereto with the process commercially known as flame-plating, whereby a layer of tungsten carbide having a thickness of .002 in. to .010 in. may be deposited upon a face of the steel body block and securely bonded thereto.

Tests have shown that steel gage blocks having their gaging surfaces provided by tungsten carbide flame-plating afford the required dimensional stability, together with unusual wearing qualities, while at the same time the overall coefficient of expansion of the block is, for all practical purposes, identical with that of a conventional steel gage block. A problem which has heretofore arisen in connection with such composite gage blocks, however, grows out of the fact that corrosive substances are almost always present in the atmosphere and in the perspiration of the user's hands, and such composite blocks are attacked by these corrosive substances at the junction of the steel body and the tungsten carbide layer or plating. In one test in which such a composite gage block was exposed to a salt atmosphere for seven days the corrosion under the edge of the tungsten carbide plating was .010 in. deeper than on the rest of the steel surface.

With this in mind it is an object of the present invention to provide a composite gage block having its gaging surfaces formed by a layer or plating of tungsten carbide bonded to a pair of opposite faces of a steel body block to provide extremely accurate and long wearing gaging faces wherein all portions of the block except the exposed gaging faces thereof are coated with a corrosion resistant metal so that the block is practically impervious to corrosive substances normally present in the atmosphere or in perspiration.

Another object of this invention resides in the provision of an unusually attractive gage block having a distinctive appearance and on which dimensional indicia and other information are readily visible.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
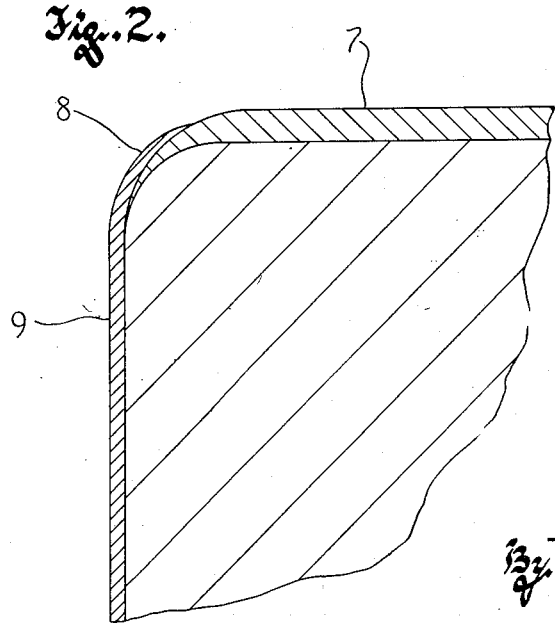

The accompanying drawing illustrates one complete example of the physical embodiment of the invention constructed according to the best mode so far devised for the practical application of the principles thereof, and in which:

Figure 1 is a perspective view of a composite gage block embodying the principles of this invention; and Figure 2 is a fragmentary cross-sectional view of the gage block of Figure 1.

Referring now to the accompanying drawing, the numeral 5 designates generally a composite gage block comprising a conventional steel body block 6 upon opposite faces of which a thin layer or plating 7 of tungsten carbide or similar very hard metal has been deposited, as by means of the process commercially known as flame-plating. It will be understood that the tungsten carbide layer is on the order of .002 in. to .004 in. thick and is securely bonded to the steel block by reason of the manner in which it is deposited thereon; consequently the tungsten carbide does not interfere with expansion and contraction of the steel body block despite the fact that the steel and the tungsten carbide have substantially different coefficients of thermal expansion.

The gage block of this invention is characterized by a thin plating 9 of gold or other corrosion resistant metal which covers the non-gaging faces of the block and extends at least part-way around a radius 8 at the marginal edge portions of the tungsten carbide layer to seal the junction between the steel block and the tungsten carbide layer all the way around the latter.

In producing a gage block of this invention, body blocks are cut from steel bar stock and after being ground to slightly over final size they are heat-treated, normalized and stabilized. Thereafter the steel body blocks are ground to size on all faces except the gaging surfaces, being ground approximately .003 in. under the final size across the gaging surfaces. The edges defined by the junctions of the gaging surfaces with the side faces of the block are rounded on a small radius, as at 8, and thereafter the gaging faces are flame-plated to deposit thereon and bond thereto a layer of tungsten carbide. The tungsten carbide layer is approximately .004 in. thick on each gaging face and extends around and covers the rounded edge radii. The gaging faces of the blocks are then finished up to the final lapping operation, the edge radii are reformed to give the marginal edges of the tungsten carbide layer the feather edge shown in Figure 2, and then the side faces of the blocks are etched and polished.

To prepare the blocks for plating with non-corrosive metal, their gaging surfaces are masked. This may be done by wringing several blocks together and securing a pair of reject blocks to the exposed gaging surfaces at the ends of the wrung together stack of blocks by means of clamps which provide electrical contacts for the plating operation. The blocks in the stack are first coated with copper, nickel, cadmium, or other undercoating, and are then plated with gold, platinum or other corrosion resistant material to a thickness of twenty-millionths of an inch.

Obviously the gaging surfaces of the blocks will mutually mask one another during the plating operation so that the plating will cover all portions of the block except the gaging surfaces thereof and will overlap and extend around the edge radii onto the marginal edge portions of the tungsten carbide layers, thereby sealing the junction between the body block and the feather edges of each layer of tungsten carbide, all the way around the latter.

Tests have shown that gage blocks made in accordance with the principles of this invention will not corrode when submerged in solutions usually used to normalize the temperature of the blocks and can be wiped off much more easily than uncoated steel blocks. Because no protective coating is required over either the gold-plated faces or the tungsten carbide gaging surfaces, gage blocks of this invention are always clean and ready for immediate use. A block plated with gold in accordance with the principles of this invention and subjected to a 36-hour salt atmosphere corrosion test showed no indication of corrosion.

Gold is preferably used for the corrosion resistant plating because the etched indicia on the sides of a gold-plated gage block stand out in strong contrast and are much more readily readable than on an unplated steel gage block, and the gold-plated block is attractive and distinctive in appearance. Platinum or other corrosion resistant metal may be used instead of gold, however.

From the foregoing description, taken together with the accompanying drawing, it will be readily apparent that this invention provides an attractive and distinctive composite gage block possessing all of the desirable attributes of an all-steel block but having much harder gaging surfaces and possessing unusual resistance to the corrosive action of substances which may be present in the atmosphere or the perspiration of a user's hand.

What I claim as my invention is:

1. A gage block comprising: a body block of metal having a predetermined hardness and coefficient of expansion, said body block having a pair of opposite substantially parallel faces; a thin layer of tungsten carbide overlying each of said faces of the body block and finished to accurate flatness and parallelism to provide gaging surfaces, said layers of tungsten carbide extending over and around the marginal edges of the parallel faces of the body block and overlying the adjacent portions of the remaining faces of the body block; and a plating of gold overlying said remaining faces of the body block and overlapping the adjacent edge portions of said tungsten carbide layers but without extending over the gaging surfaces thereof, so that said gold plating covers and seals the juncture between the edges of said layers of tungsten carbide and the body block whereby entry of corrosive substances between the body block and said layers of tungsten carbide is prevented.

2. The gage block of claim 1 wherein the corners of the body block defined by said faces and the remaining faces of the body block are rounded on a small radius; wherein the tungsten carbide layers extend partially around said rounded corners and have their edge portions rounded on a small radius; and wherein the gold plating extends partly around the rounded edge portions of the tungsten carbide layers.

3. A gage block comprising: a body block of metal having a predetermined hardness, said body block having a pair of opposite substantially parallel faces; a thin layer of wear resistant metal considerably harder than the metal of which the body block is formed overlying and bonded to each of said substantially parallel faces of the body block and finished to accurate flatness and parallelism to provide gaging surfaces, said layers of hard, wear resistant metal extending over and around the marginal edges of the parallel faces of the body block and terminating in feather edges which overlie and merge with the adjacent remaining faces of the body block; and a plating of a metal which is resistant to common corrosive substances overlying said remaining faces of the body block and overlapping the adjacent feather edge portions of said hard wear resistant layers, but without extending over the gaging surfaces thereof, so that said corrosive resistant plating covers and seals the junction between the feather edges of said layers of hard wear resistant metal and the body block to prevent entry of corrosive substances between the body block and said layers of hard wear resistant metal.

References Cited in the file of this patent

UNITED STATES PATENTS

| 1,862,231 | McFarland | June 7, 1932 |
| 2,208,371 | Johansson | July 16, 1940 |
| 2,213,767 | Markwick | Sept. 3, 1940 |
| 2,588,227 | Gaerlich | Mar. 4, 1952 |
| 2,653,211 | Andrus | Sept. 22, 1953 |